United States Patent
Iriyama

(10) Patent No.: US 8,659,833 B2
(45) Date of Patent: Feb. 25, 2014

(54) COLOR SEPARATING OPTICAL SYSTEM AND IMAGE PICKUP APPARATUS INCLUDING THE SAME

(71) Applicant: Canon Kabushiki Kaisha, Tokyo (JP)

(72) Inventor: Yutaka Iriyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/676,303

(22) Filed: Nov. 14, 2012

(65) Prior Publication Data

US 2013/0120851 A1 May 16, 2013

(30) Foreign Application Priority Data

Nov. 16, 2011 (JP) ................... 2011-250422

(51) Int. Cl.
G02B 27/14 (2006.01)

(52) U.S. Cl.
USPC .......................... 359/634; 359/630

(58) Field of Classification Search
USPC ........................................ 359/634
See application file for complete search history.

(56) References Cited

U.S. PATENT DOCUMENTS 6,342,980 B1 * 1/2002 Omuro ................. 359/834

FOREIGN PATENT DOCUMENTS

JP 2000266915 A 9/2000

* cited by examiner

Primary Examiner — James Jones
(74) Attorney, Agent, or Firm — Rossi, Kimms & McDowell LLP

(57) ABSTRACT

A color separating optical system includes a first prism including a second surface for separating an beam into reflected and transmitted beams; and a second prism including a third surface disposed to have an air gap interposed between the third and second surfaces and a fourth surface for separating a beam from the third surface into reflected and transmitted beams. At least one of the second and third surfaces has a multi-layer film, and $0.70 < nd \times \cos\theta_{2A}/(\lambda/4) < 1.2$ is satisfied, where $\theta_{2A} = \sin^{-1}\{(N_g/N_m)\sin(\theta_2)\}$, $\lambda$ central wavelength in a wavelength range of the beam to be separated by the second prism, nd thickness of an outermost layer of the multi-layer film, Nm refractive index of the outermost layer for the central wavelength, Ng refractive index of a glass material of the second prism for the central wavelength in the wavelength range of color light to be separated, and $\theta_2$ apex angle of the second prism.

6 Claims, 11 Drawing Sheets

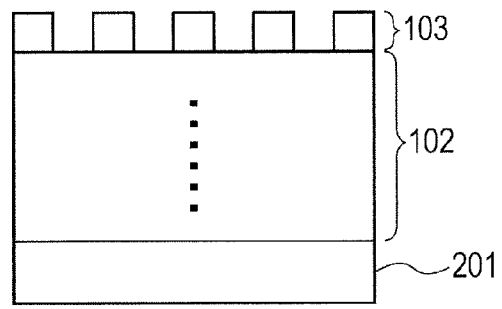
FIG. 10
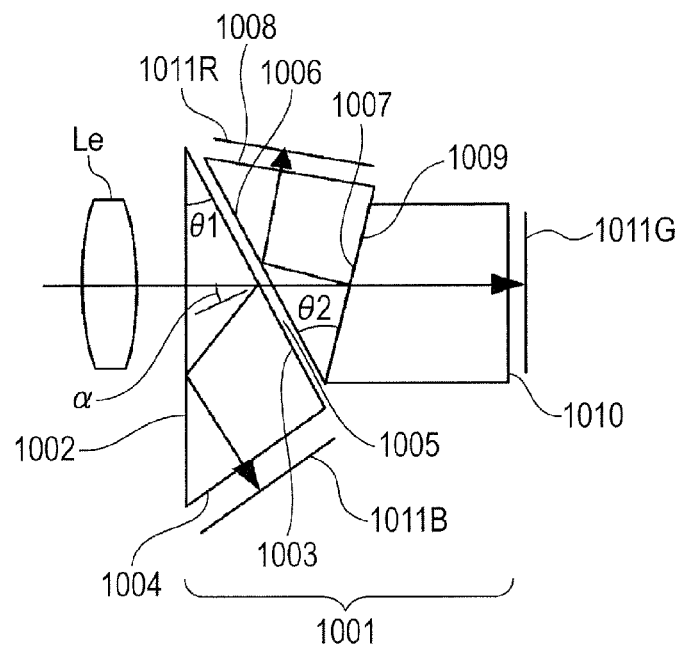
FIG. 11
FIG. 12A
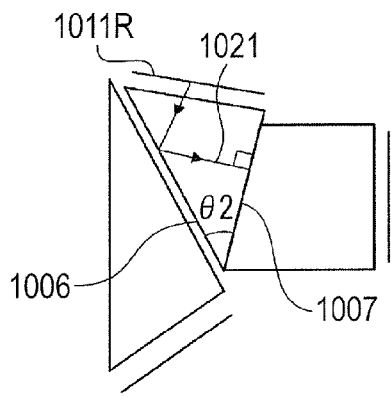
FIG. 12B
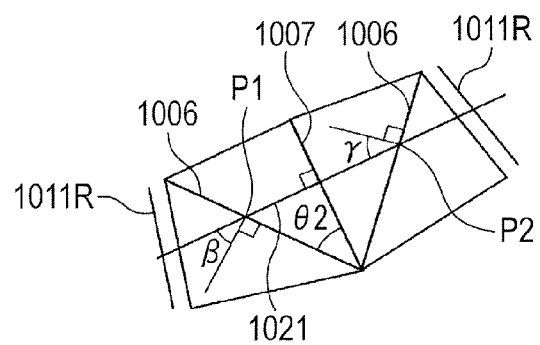

COLOR SEPARATING OPTICAL SYSTEM AND IMAGE PICKUP APPARATUS INCLUDING THE SAME

BACKGROUND OF THE INVENTION

1. Field of the Invention

The present invention relates to a color separating optical system and an image pickup apparatus including the same, and more particularly, to a color separating prism for separating light from an objective lens into multiple beams, and an image pickup apparatus using the color separating prism.

2. Description of the Related Art

Broadcasting cameras and some consumer high-grade imaging cameras often use a so-called Philips type three-color separating optical system, which has an air gap between a first prism and a second prism. The Philips type three-color separating optical system is briefly described below.

FIG. 11 illustrates a conceptual diagram of the Philips type color separating optical system. In an image pickup apparatus using this type of color separating optical system, a solid-state image pickup element as represented by a CCD is used. The surface of the CCD is subjected to metal coating so as to have a relatively high reflectance. Reflection involving strong diffraction therefore occurs on the CCD surface in the case of photographing an intense light source. Part of light reflected by the CCD surface re-enters a solid-state image pickup element 1011R via an optical path (1021) of the second prism as illustrated in FIG. 12A, and appears as a ghost. FIG. 12B is a diagram expanding the ghost path (1021) of FIG. 12A along the second prism. In particular, FIG. 12B illustrates a beam that enters a reflection surface 1007 perpendicularly to be reflected. As understood from FIG. 12B, of the light reflected by the CCD, light immediately after having entered the second prism enters a surface 1006 at an incident angle β and light after being reflected by a surface 1007 enters the surface 1006 again at an angle γ, both of which are equal to an apex angle θ2 of the prism. In the case where the apex angle θ2 satisfies $θ2 < \sin^{-1}(1/Ng)$ where Ng represents a refractive index of a glass material of the prism, light in this ghost path is not totally reflected by the surface 1006, but interference occurs between light beams reflected by the surfaces 1003 and 1006 sandwiching an air gap 1005. In the case where the apex angle θ2 satisfies $θ2 \geq \sin^{-1}(1/Ng)$, on the other hand, light in this ghost path is totally reflected by the surface 1006. No interference therefore occurs so that light is totally reflected reliably to return to the solid-state image pickup element.

FIG. 13 is a diagram illustrating a ghost path (1022) in which the incident angle to the surface 1007 slightly deviates from the right angle. In this case, the incident angle to the surface 1006 is changed, and hence ghost reflection intensity changes depending on locations. An incident angle at a point P3 is larger than an incident angle at a point P4, and hence it is understood that total reflection is more likely to occur at the point P3 while total reflection is less likely to occur at the point P4. Therefore, interference occurs at the point P4 when the total reflection does not occur. FIG. 14 illustrates a schematic diagram of a ghost appearing on an image. In a total reflection ghost region of FIG. 14, total reflection occurs at both the points P3 and P4, whereas in a region in which an interference ghost appears, interference occurs at the point P3 or the point P4. The change in θ2 changes the total reflection ghost region appearing on the screen and the region in which an interference pattern appears.

For example, Japanese Patent Application Laid-Open No. 2000-266915 discloses a beam splitting prism in which the apex angle θ2 of the second prism is appropriately set so that a ghost may be totally reflected by the incident surface 1006 of the second prism to prevent the occurrence of an interference pattern caused by the air gap.

In the conventional technology disclosed in Japanese Patent Application Laid-Open No. 2000-266915, however, although the interference pattern can be made less conspicuous, the region whose reflectance for a ghost is 100% is increased. Therefore, an image in the solid-state image pickup element for red becomes an image having a flare on the entire screen.

SUMMARY OF THE INVENTION

The present invention provides a color separating optical system capable of suppressing a ghost caused by surfaces constituting an air gap while maintaining three-color separating characteristics.

According to the present invention, there is provided a color separating optical system for separating an incident beam into a plurality of color beams, including: a first prism including a first surface into which the incident beam enters and a second surface for separating the incident beam into a reflected beam and a transmitted beam, for separating the reflected beam; and a second prism including a third surface disposed to have an air gap interposed between the third surface and the second surface and a fourth surface for separating a beam entering from the third surface into a reflected beam and a transmitted beam, and allowing the reflected beam reflected by the fourth surface to exit from the second prism after being reflected by the third surface, in which at least one of the second surface and the third surface has a multi-layer film formed thereon, and the following condition is satisfied:

$$0.70 < nd \times \cos θ2A/(λ/4) < 1.2,$$

where $θ2A = \sin^{-1}\{(Ng/Nm)\sin(θ2)\}$, λ represents a central wavelength (nm) in a wavelength range of the beam to be separated by the second prism, nd represents an optical thickness (nm) of an outermost layer of the multi-layer film, Nm represents a refractive index of the outermost layer of the multi-layer film with respect to the central wavelength, Ng represents a refractive index of a glass material of the second prism with respect to the central wavelength in the wavelength range of color light to be separated by the second prism, and θ2 represents an apex angle formed by the third surface and the fourth surface of the second prism.

The present invention can provide the color separating optical system capable of suppressing a ghost caused by the surfaces constituting the air gap while maintaining the three-color separating characteristics.

Further features of the present invention will become apparent from the following description of exemplary embodiments with reference to the attached drawings.

BRIEF DESCRIPTION OF THE DRAWINGS

FIG. 10 is a conceptual diagram of a film having a micro periodic structure.

FIG. 11 is a cross-sectional diagram of a color separating optical system.

FIGS. 12A and 12B are optical path diagram of a ghost to be solved by the present invention.

DESCRIPTION OF THE EMBODIMENTS

Referring to the accompanying drawings, a color separating optical system according to an exemplary embodiment of the present invention is described in detail below.

Figure 1:
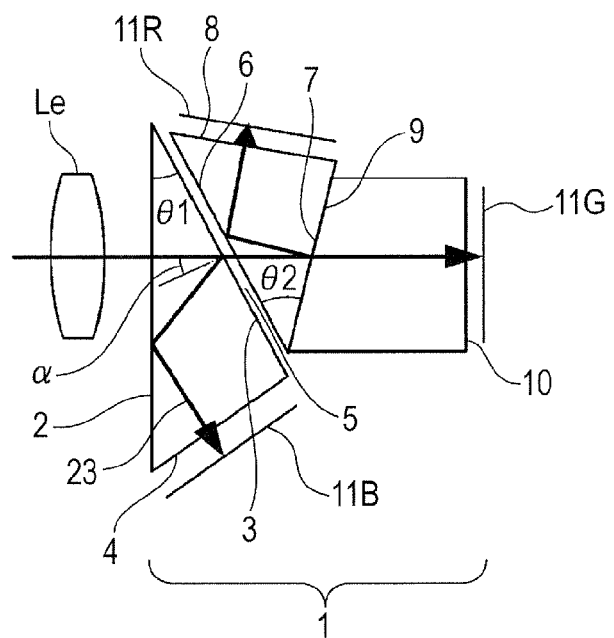
FIG. 1 is a cross-sectional diagram of a prism in Embodiment 1 of the present invention.

FIG. 1 is a cross-sectional diagram of a color separating prism 1 serving as the color separating optical system according to the present invention. The color separating prism 1 is included in an image pickup apparatus at a position between solid-state image pickup elements 11B, 11G, and 11R and an objective lens Le detachably mounted mountable to the image pickup apparatus. The color separating prism 1 has the function of separating light from the objective lens Le into light beams of multiple colors of blue, green, and red, and guiding the respective light beams to the blue, green, and red solid-state image pickup elements 11B, 11G, and 11R. The respective solid-state image pickup elements 11B, 11G, and 11R convert blue, green, and red image information into electrical image signals. The color separating prism 1 and the respective solid-state image pickup elements are fixed in a camera main body as the image pickup apparatus.

The color separating prism 1 as the color separating optical system includes, in order from the object side in a traveling direction of a beam, a first prism (prism for blue color separation), a second prism (prism for red color separation) disposed adjacently to the first prism via an air gap, and a third prism (prism for guiding green light) bonded to the second prism. All optical materials of the respective prisms have the same refractive index. The first prism includes a blue-light reflective dichroic film (reflection surface for blue) 3 made of a dielectric multi-layer film that reflects only blue light (first beam) at the surface 3 (second surface) in contact with the air gap and transmits the remaining light (second beam). A light beam enters a surface 2 (first surface) of the first prism at an incident angle of 0 degrees, and hence an incident angle α of the light beam entering the surface 3 is equal to an apex angle θ1 (angle formed by the surface 2 and the surface 3) of the first prism.

Figure 2:
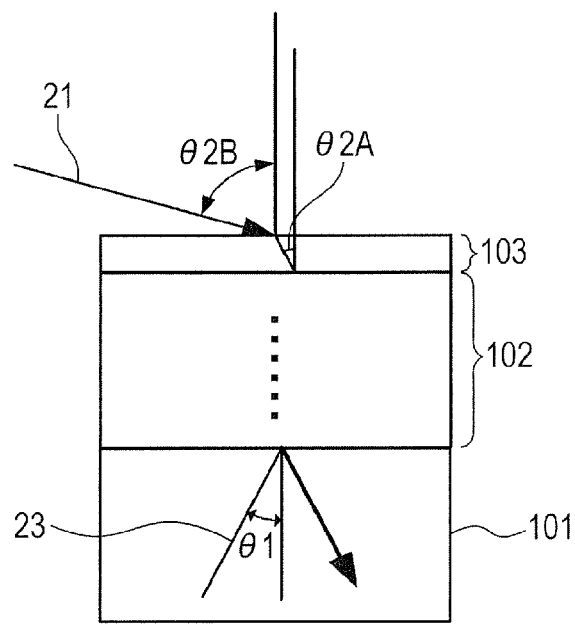
FIG. 2 is a conceptual diagram of the film structure of the present invention.

The second prism includes a red-light reflective dichroic film (reflection surface for red) 7 at the surface bonded to the third prism, which is made of a dielectric multi-layer film that reflects only red light (third beam) and transmits the remaining green light (fourth beam). The color separating prism 1 receives light from the objective lens through the incident surface 2 of the first prism, and separates the light at the blue-light reflective dichroic surface 3 of the first prism into reflected light of a blue component and transmitted light of the other color components. The reflected blue light is totally reflected by the incident surface 2 and exits from a surface 4 of the first prism to be guided to the solid-state image pickup element 11B for the blue component. Of the light beams (red component and green component) separated by transmitting through the surface 3, the red component light is reflected by the red-light reflective dichroic surface 7 (fourth surface), whereas the green component light is transmitted. The reflected red light is totally reflected by an incident surface 6 (reflection surface) (third surface) of the second prism in contact with an air gap 5, and exits from an exit surface 8 to be guided to the solid-state image pickup element 11R for the red component. The green component light, which has transmitted through both the two dichroic films, exits from a surface 10 of the third prism to be guided to the solid-state image pickup element 11G for the green component. FIG. 2 is a schematic micro-scale diagram illustrating the film structure of the surface 3 as an exit surface of the first prism according to the embodiment of the present invention and illustrating portions into which a ghost ray 21 and a normal reflection ray 23 enter.

The surface of a CCD used as the solid-state image pickup element is subjected to metal coating having a relatively high reflectance, and strong reflection occurs on the CCD surface in the case of photographing an intense light source. Therefore, as illustrated in FIG. 1, part of the beam that has been reflected by the surface 7 of the second prism and thereafter reflected by the surface 6 to enter the solid-state image pickup element 11R is reflected on the solid-state image pickup element 11R. Then, the beam is reflected by the surface 6, the surface 7, and the surface 6 in this order to re-enter the solid-state image pickup element 11R, and appears as a ghost.

As illustrated in FIG. 2, in order to selectively reflect a component in the blue-channel wavelength region at a principal ray incident angle θ1, a dielectric multi-layer film 102 having about 20 to 30 layers is formed on the surface 3 of a glass substrate 101.

A critical angle of the glass material of the second prism, which is determined from a total reflecting condition at a refractive index Ng with respect to a ray having a central wavelength of colored light to be separated by the second prism, is expressed by $\sin^{-1}(1/Ng)$. Light having an incident angle smaller than the critical angle never undergoes total reflection. A ray (ghost ray) that is reflected on the solid-state image pickup element 11R and reflected by the surface 6 and thereafter enters the surface 7 perpendicularly to be reflected does not undergo total reflection at the surface 6 when the following expression is satisfied.

$$\theta2 < \sin^{-1}(1/Ng)$$

In this case, a ray that has entered the surface 6 without being reflected (a ray that has exited from the surface 6 into the air gap) enters the surface 3 as a ghost ray. The ghost ray that has entered the surface 6 from the surface 7 is refracted to enter the surface 3. Because the ghost ray that has entered the surface 7 perpendicularly enters the surface 6 at the incident angle θ2, an incident angle θ2B of the ghost ray to the surface 3 is expressed as follows according to Snell's law.

$$θ2B = \sin^{-1}(Ng \times \sin θ2)$$

When the ghost ray that has entered the surface 3 is reflected by the surface 3 and enters the surface 6, the ghost ray interferes with the ray reflected by the surface 6. In the color separating prism of the present invention, in order to suppress the occurrence of this interference, as illustrated in FIG. 2, the multi-layer film on the surface 3 includes a low refractive index film 103 formed on a dielectric multi-layer film 102 as the outermost layer. The outermost low refractive index film 103 is formed so as to have a thickness satisfying the following condition:

$$0.70 < nd \times \cos θ2A/(λ/4) < 1.2 \quad (1)$$

where $θ2A = \sin^{-1}\{(Ng/Nm) \times \sin(θ2)\}$.

In Expression (1), θ2A represents an angle of the ghost ray in the outermost layer, λ represents a central wavelength (nm) in the waveband of light to be separated and extracted by the second prism, which is herein 650 nm as the center of the red color region, nd represents an optical thickness (nm) of the outermost layer, and nd×cos θ2A represents an optical path length of the above-mentioned ghost in the outermost layer. When the film thickness nd of the outermost layer is set so that the optical path length becomes substantially λ/4, ghost reflection can be suppressed. Therefore, if the upper or lower limit condition of Expression (1) is not satisfied, the ghost ray is reflected by the surface of the outermost layer 103. Expression (1) is formed more preferably under the following condition.

$$0.84 < nd \times \cos θ2A/(λ/4) < 1.2 \quad (1a)$$

Expression (1) is formed still more preferably under the following condition.

$$0.9 < nd \times \cos θ2A/(λ/4) < 1.1 \quad (1b)$$

The low refractive index film 103 as the outermost layer is formed of a material satisfying the following expression:

$$1.05 < Nm < 1.34 \quad (2)$$

where Nm represents a refractive index with respect to a substantially central wavelength in the wavelength range of the beam to be separated and obtained by reflection at the second prism, for example, the wavelength of 650 nm. When the outermost layer has a refractive index in this range, it is possible to secure an appropriate refractive index difference between the low refractive index film 103 as the outermost layer and air constituting the air gap 5 that contacts with the low refractive index film 103 and an appropriate refractive index difference between the glass substrate 101 and the low refractive index film 103. Therefore, when the film thickness nd of the outermost layer is set so as to satisfy Expression (1), the ghost reflection can be suppressed more efficiently. In particular, if the upper limit condition of Expression (2) is not satisfied, it becomes difficult to suppress the reflectance in the waveband of 600 to 700 nm at an incident angle corresponding to normal light (improve color reproducibility) and suppress a ghost at the same time.

It is more preferred that Expression (2) satisfy Expression (2a).

$$1.15 < Nm < 1.32 \quad (2a)$$

It is preferred that the refractive index Ng of the glass material of the prism with respect to the substantially central wavelength in the wavelength range of the beam to be separated and obtained by reflection at the second prism, for example, the wavelength of 650 nm, satisfy Expression (3).

$$1.35 ≤ Ng \quad (3)$$

When the condition of Expression (3) is satisfied, it is possible to secure an appropriate refractive index difference between the low refractive index film 103 as the outermost layer and the air constituting the air gap 5 that contacts with the low refractive index film 103 and an appropriate refractive index difference between the glass substrate 101 and the low refractive index film 103. Therefore, when the film thickness nd of the outermost layer is set so as to satisfy Expression (1), the ghost reflection can be suppressed more efficiently. It is more preferred that Expression (3) satisfy Expression (3a).

$$1.43 < Ng < 1.70 \quad (3a)$$

In addition, the refractive index Ng of the glass material of the prism with respect to the substantially central wavelength in the wavelength range of the beam to be separated and obtained by reflection at the second prism, for example, the wavelength of 650 nm, satisfies Expression (4).

$$0.75 < θ2/\sin^{-1}(1/Ng) < 1.1 \quad (4)$$

When $θ2/\sin^{-1}(1/Ng) < 1$ is established, light in this ghost path does not undergo total reflection at the surface 6, and therefore the effect of the low refractive index film 103 of the present invention can be enjoyed. However, in order to allow the incident beam from the lens to be totally reflected by the surface 6 of the second prism so as to be guided to the solid-state image pickup element 11R, it is necessary to satisfy the following condition:

$$θ2 ≥ [θ1 + \sin^{-1}(1/Ng) + \sin^{-1}\{1/(2 \times Ng \times Fno)\}]/2 \quad (5)$$

where Fno represents an F-number of the objective lens Le. If the lower limit of Expression (4) is not satisfied, the objective lens Le that can be used is limited to a lens having a large F-number (dark lens) in order to satisfy the total reflecting condition expressed by Expression (5), which is not preferred. Further, the region not satisfying the upper limit of Expression (4) is the region for total reflection, and hence the effect of the present invention becomes smaller if the upper limit of Expression (4) is not satisfied. The upper limit value of Expression (4) is set to 1.1 rather than 1 in consideration of the range of the incident angle to the color separating optical system. It is more preferred that Expression (4) satisfy Expression (4a).

$$0.79 < θ2/\sin^{-1}(1/Ng) < 1.02 \quad (4a)$$

In the above description, the low refractive index film 103 has been exemplified as the outermost layer of the multi-layer film formed on the surface 3 of the prism 1. The present invention is, however, not limited to this structure. An interference pattern caused by a ghost, which is to be suppressed by the present invention, is generated by the beam that has been reflected by the surface 3 and the surface 6 sandwiching the air gap 5. Thus, a similar effect can be obtained even by the structure of reducing the reflection at the surface 6, as well as the above-mentioned structure of reducing the reflection at the surface 3. Therefore, the effect of the present invention can be obtained even by forming a low refractive index film as the outermost layer of the dichroic film on the surface 6. In addition, the effect of the present invention can be obtained even by forming low refractive index films as the outermost layers of dichroic films on both the surface 3 and the surface 6.

Embodiment 1

Now, a color separating optical system according to Embodiment 1 of the present invention is described with reference to FIGS. 3A and 3B.

Figure 3A:
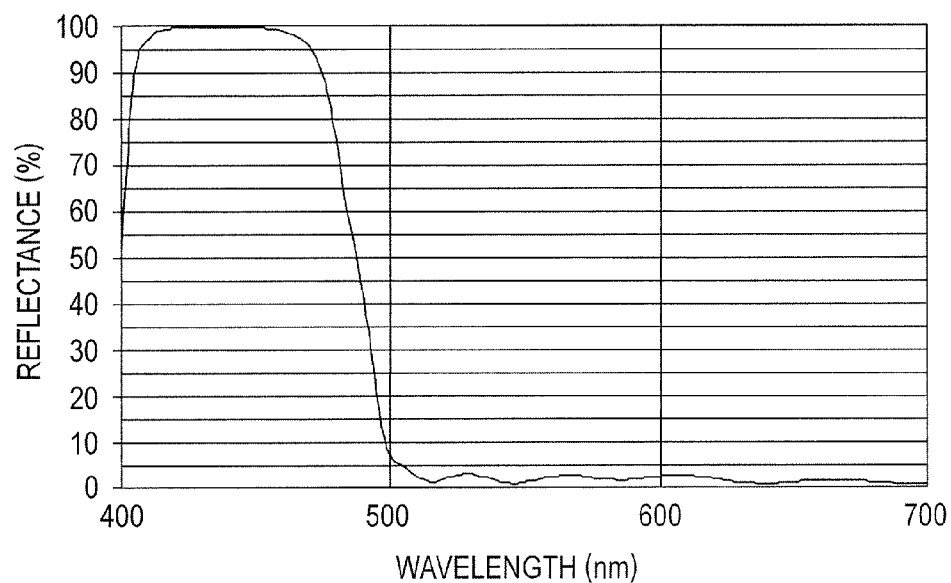
FIG. 3A is a graph of spectral characteristics for normal light in Embodiment 1 of the present invention.

Table 1 shows the structure of a multi-layer film formed on the surface 3, and FIG. 3A shows reflectance characteristics at the incident angle θ1 corresponding to normal light in Embodiment 1. The multi-layer film includes a multi-layer film having 27 layers and a low refractive index film having a single layer in order from the substrate. The multi-layer film having 27 layers is formed in order that the reflectance in the wavelength region of 400 to 500 nm for normal light may become 70% or more. As described in Table 8, the conditions of Expressions (1), (2), and (4) are satisfied.

The prism shape satisfies Conditional Expression (4), and hence the incident angle of a ghost can be reduced. The effect of the low refractive index film in Embodiment 1 becomes larger as the incident angle becomes smaller. Therefore, in Embodiment 1, the upper limit of Conditional Expression (4) is satisfied so as to suppress the reflection of a ghost in a wide range of an image pickup plane.

Figure 3B:
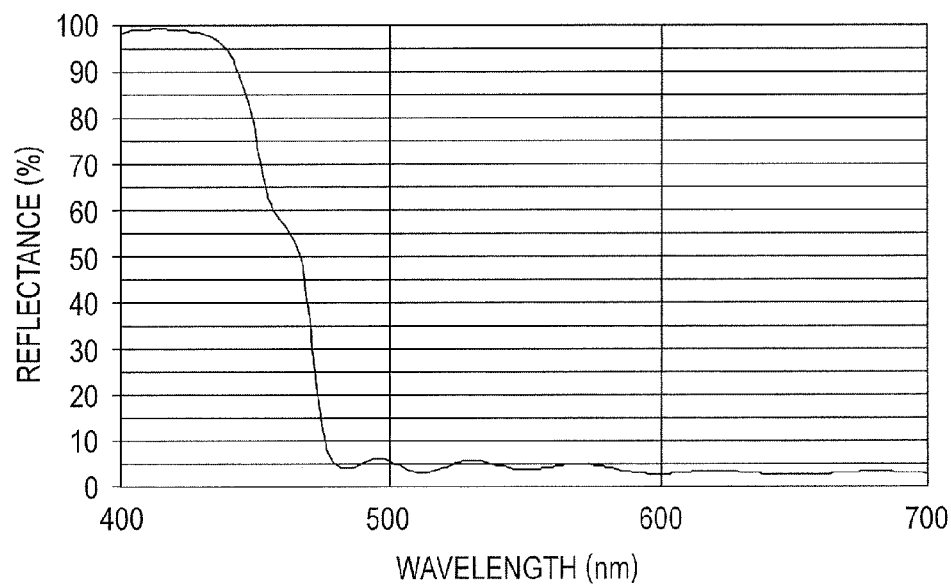
FIG. 3B is a graph of spectral characteristics for a ghost in Embodiment 1 of the present invention.

FIG. 3B shows reflectance characteristics of the multi-layer film formed on the surface 3 in Embodiment 1 at an incident angle δ=θ2B×0.9=74.8°. The incident angle δ is defined as one of the angles at which the ghost graveling along the above-mentioned optical path as illustrated in FIGS. 12A and 12B enters the surface 3. This angle is close to an angle of a ghost toward vertical edges of a sensor with a 4:3 aspect ratio in the case where a high-brightness object is present at the center of the screen and a ghost is generated in this sensor. The reflectance in the wavelength region of 600 to 700 nm is 5% or less. When this reflectance condition is satisfied, the above-mentioned ghost reflection can be suppressed.

The refractive index Nm of the low refractive index film in Embodiment 1 is 1.25. When Nm=1.25 is established, the above-mentioned ghost is suppressed, and further, the reflectance for normal light in the waveband of 600 to 700 nm at a smaller incident angle can also be suppressed. Thus, rays in wavebands other than the B-channel can be prevented from being guided to the solid-state image pickup element 11B, thus suppressing the reduction in color reproducibility.

Embodiment 2

Figure 4A:
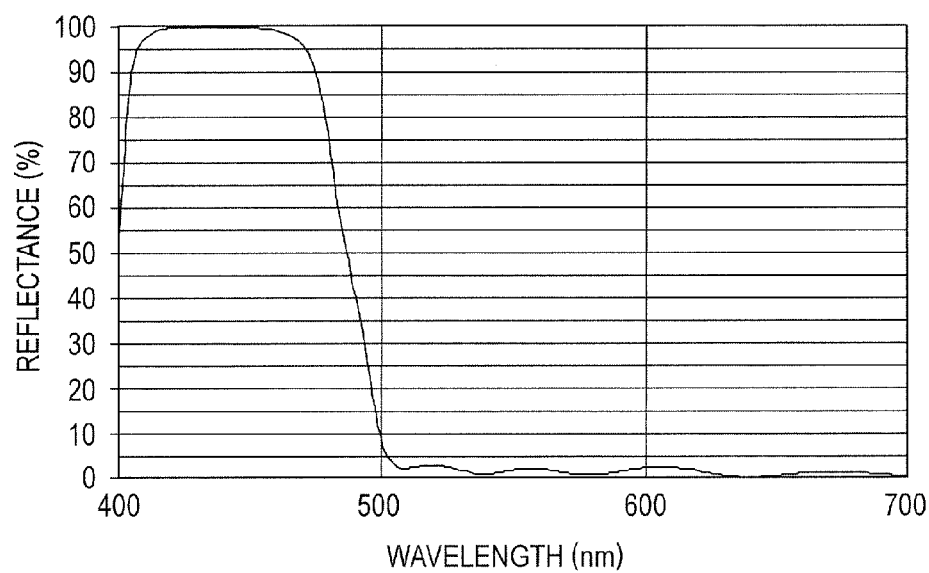
FIG. 4A is a graph of spectral characteristics for normal light in Embodiment 2 of the present invention.
Figure 4B:
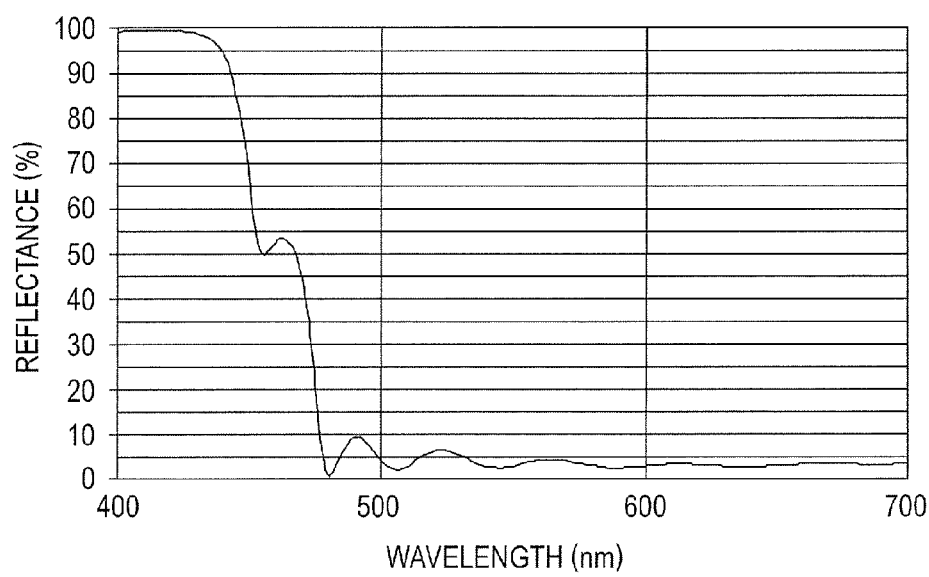
FIG. 4B is a graph of spectral characteristics for a ghost in Embodiment 2 of the present invention.

Referring to FIGS. 4A and 4B, a color separating optical system according to Embodiment 2 of the present invention is described. Table 2 shows the structure of a multi-layer film formed on the surface 3 in Embodiment 2. FIG. 4A shows reflectance characteristics of the multi-layer film formed on the surface 3 at the incident angle θ1 corresponding to normal light, and FIG. 4B shows reflectance characteristics thereof at the incident angle δ=θ2B×0.9=74.8°.

The prism shape in Embodiment 2 is the same as in Embodiment 1. The difference is the film structure of the first prism on the exit side. The multi-layer film in Embodiment 2 includes a multi-layer film having 27 layers and a low refractive index film having a single layer in order from the substrate. As described in Table 8, the conditions of Expressions (1), (2), and (4) are satisfied, and hence the ghost refection can be suppressed satisfactorily, and the occurrence of an interference pattern can be suppressed satisfactorily.

Embodiment 3

Figure 5A:
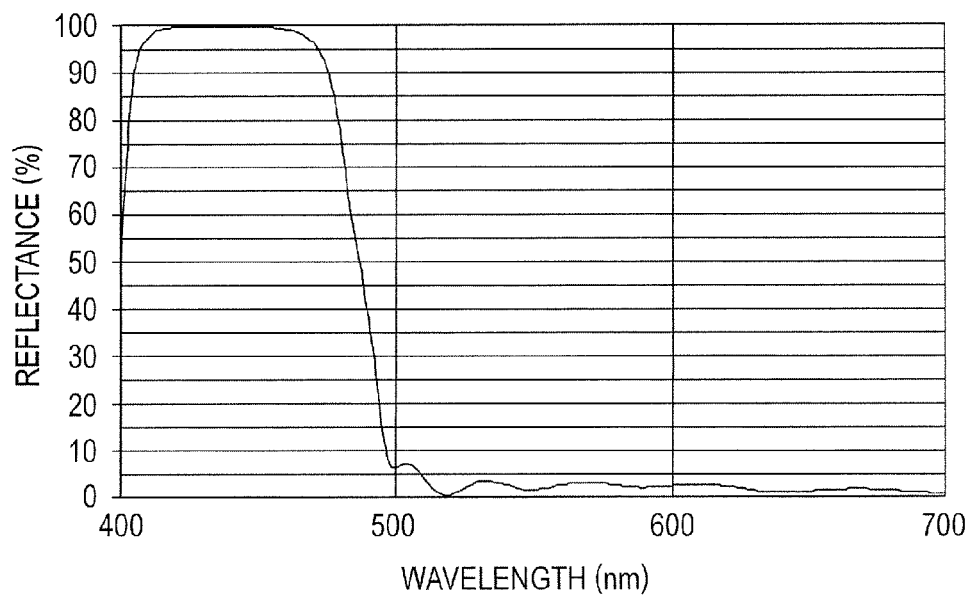
FIG. 5A is a graph of spectral characteristics for normal light in Embodiment 3 of the present invention.
Figure 5B:
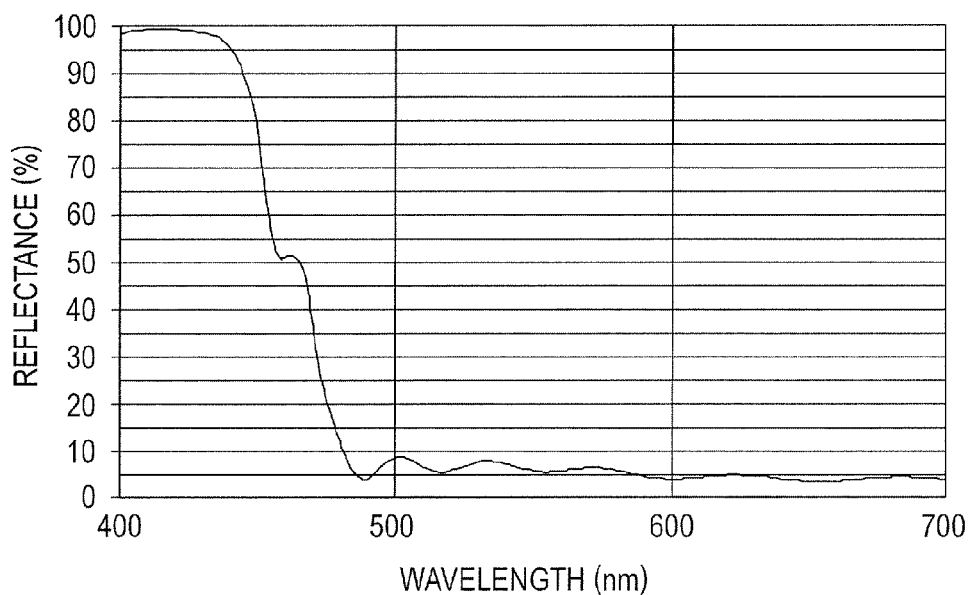
FIG. 5B is a graph of spectral characteristics for a ghost in Embodiment 3 of the present invention.

Referring to FIGS. 5A and 5B, a color separating optical system according to Embodiment 3 of the present invention is described. Table 3 shows the structure of a multi-layer film formed on the surface 3 in Embodiment 3. FIG. 5A shows reflectance characteristics of the multi-layer film formed on the surface 3 at the incident angle θ1 corresponding to normal light, and FIG. 5B shows reflectance characteristics thereof at the incident angle δ=θ2B×0.9=74.8°.

The prism shape in Embodiment 3 is the same as in Embodiment 1. The difference is the film structure of the first prism on the exit side. The multi-layer film in Embodiment 3 includes a multi-layer film having 27 layers and a low refractive index film having a single layer in order from the substrate. As described in Table 8, the conditions of Expressions (1), (2), and (4) are satisfied, and hence the ghost reflection can be suppressed satisfactorily, and the occurrence of the interference pattern can be suppressed satisfactorily.

Embodiment 4

Figure 6:
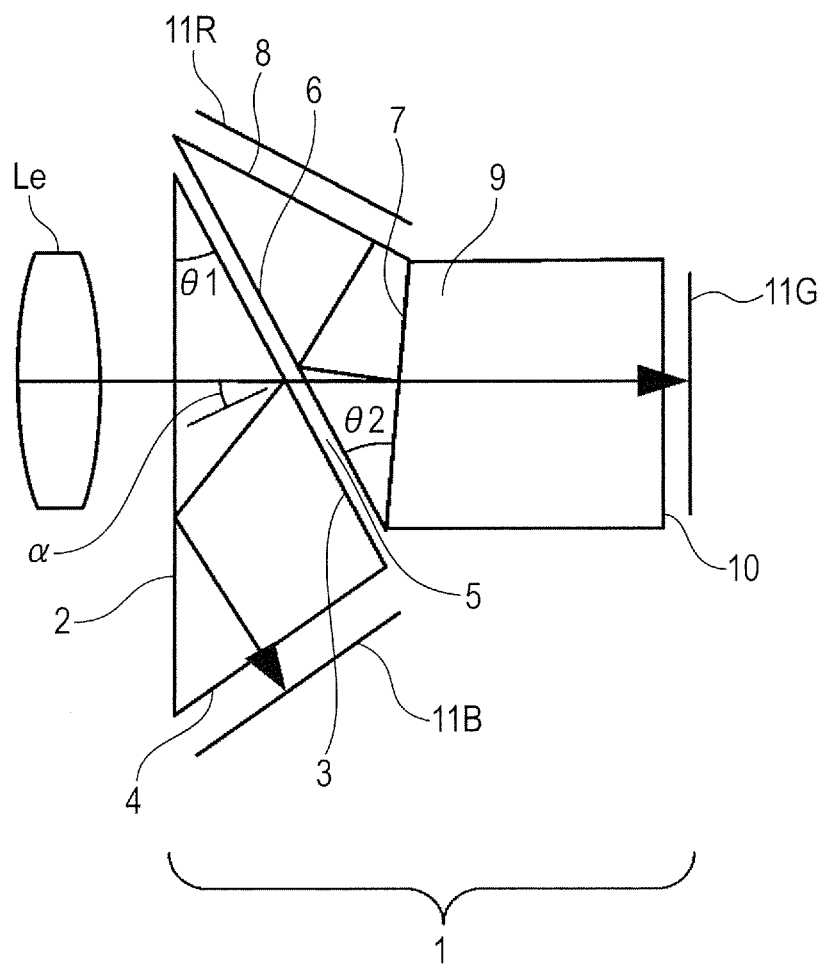
FIG. 6 is a cross-sectional diagram of a prism in Embodiment 4 of the present invention.
Figure 7A:
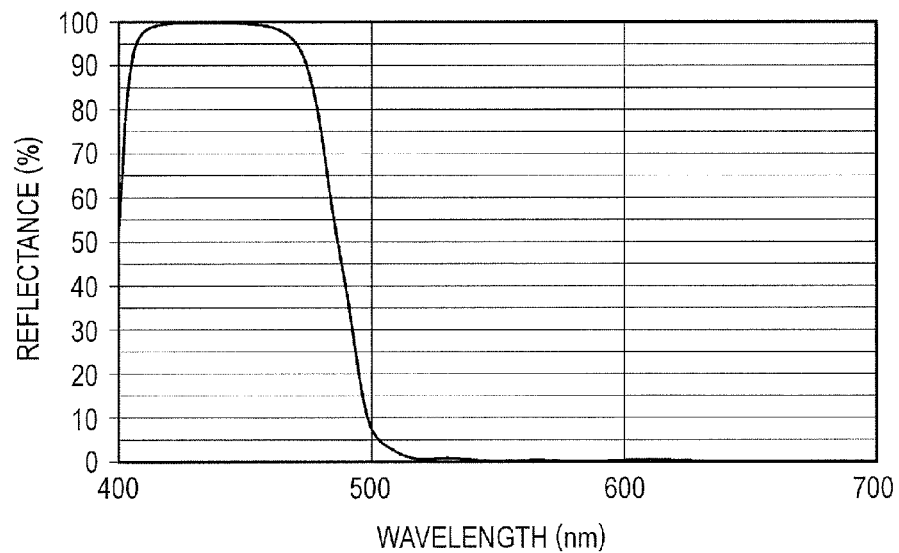
FIG. 7A is a graph of spectral characteristics for normal light in Embodiment 4 of the present invention.
Figure 7B:
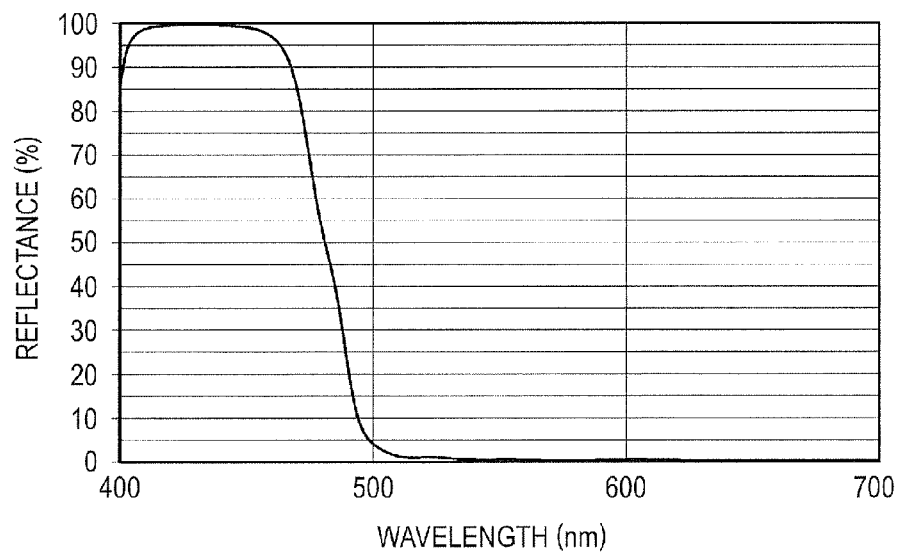
FIG. 7B is a graph of spectral characteristics for a ghost in Embodiment 4 of the present invention.

Referring to FIGS. 6, 7A, and 7B, a color separating optical system according to Embodiment 4 of the present invention is described. FIG. 6 is a cross-sectional diagram of a prism in Embodiment 4.

Table 4 shows the structure of a multi-layer film formed on the surface 3 in Embodiment 4. FIG. 7A shows reflectance characteristics of the multi-layer film formed on the surface 3 at the incident angle θ1 corresponding to normal light, and FIG. 7B shows reflectance characteristics thereof at an incident angle δ=θ2B×0.9=50.0°. The apex angle θ2 of the second prism in Embodiment 4 is 32.11°, and as described in Table 8, the conditions of Expressions (1), (2), and (4) are satisfied. Therefore, the ghost reflection can be suppressed satisfactorily, and the occurrence of an interference pattern can be suppressed satisfactorily. In this manner, the condition (Expression (5)) for totally reflecting the incident beam from the lens by the surface 6 of the second prism is satisfied without increasing Fno of the lens available for the prism.

Embodiment 5

Figure 8A:
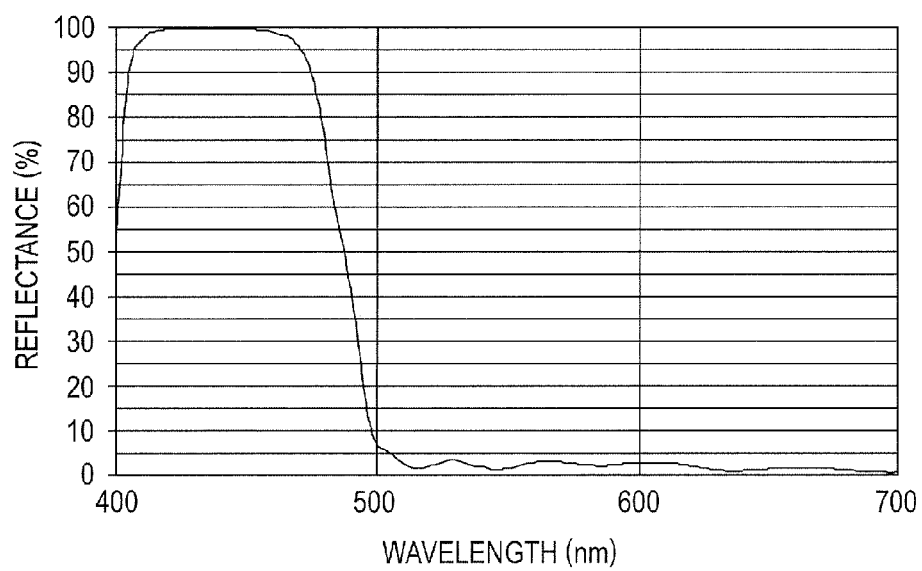
FIG. 8A is a graph of spectral characteristics for normal light in Embodiment 5 of the present invention.
Figure 8B:
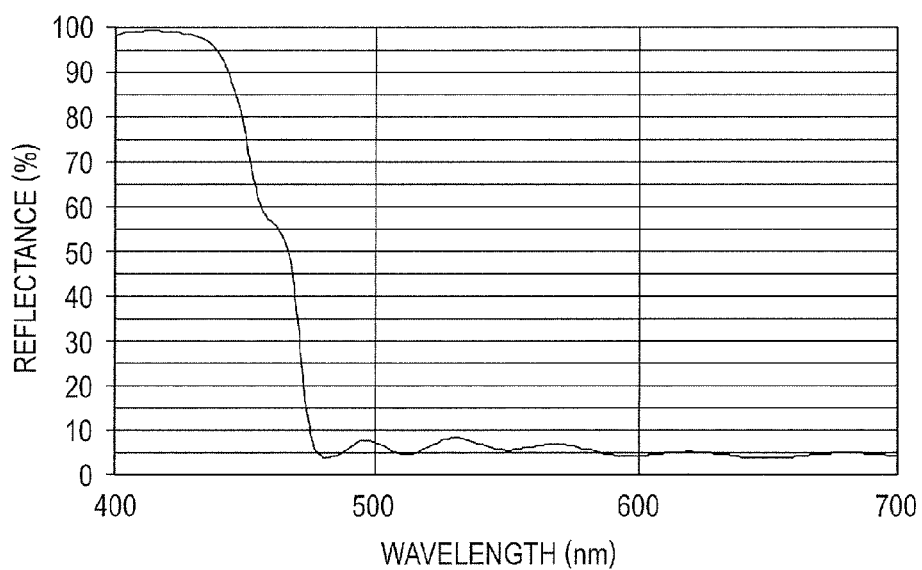
FIG. 8B is a graph of spectral characteristics for a ghost in Embodiment 5 of the present invention.

Referring to FIGS. 8A and 8B, a color separating optical system according to Embodiment 5 of the present invention is described. Table 5 shows the structure of a multi-layer film formed on the surface 3 in Embodiment 5. FIG. 8A shows reflectance characteristics of the multi-layer film formed on the surface 3 at the incident angle θ1 corresponding to normal light, and FIG. 8B shows reflectance characteristics thereof at the incident angle δ=θ2B×0.9=74.8°.

The prism shape in Embodiment 5 is the same as in Embodiment 1. The difference is the refractive index of the low refractive index film corresponding to the outermost layer of the first prism on the exit side. The multi-layer film in Embodiment 5 includes a multi-layer film having 27 layers and a low refractive index film having a single layer in order from the substrate. As described in Table 8, the conditions of Expressions (1), (2), and (4) are satisfied.

Embodiment 6

Figure 9A:
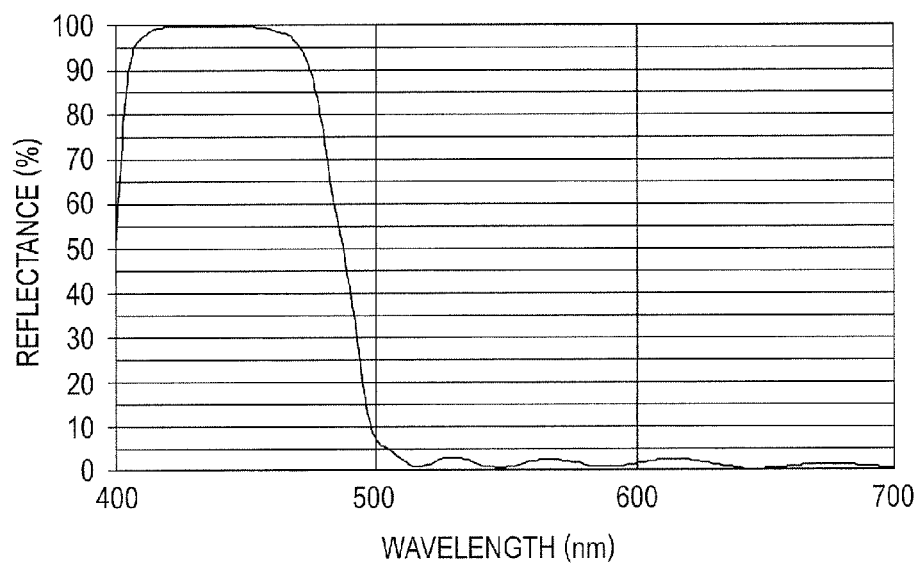
FIG. 9A is a graph of spectral characteristics for normal light in Embodiment 6 of the present invention.
Figure 9B:
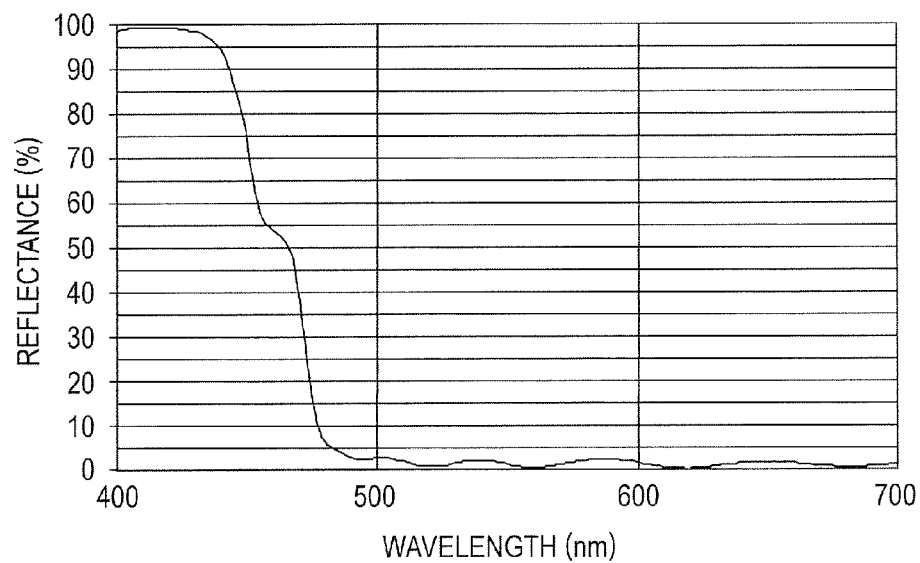
FIG. 9B is a graph of spectral characteristics for a ghost in Embodiment 6 of the present invention.
Figure 13:
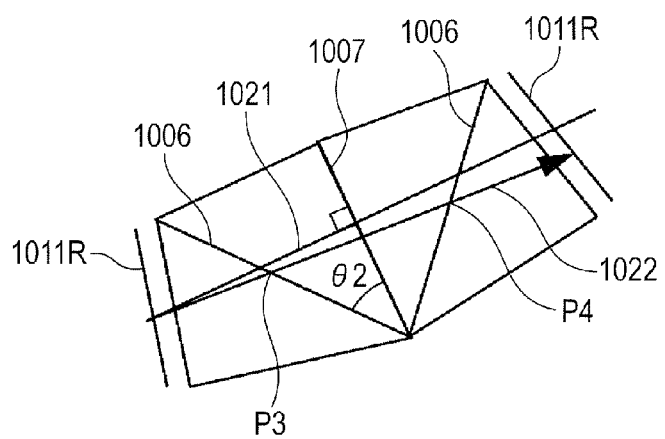
FIG. 13 is an optical path diagram of a ghost to be solved by the present invention.
Figure 14:
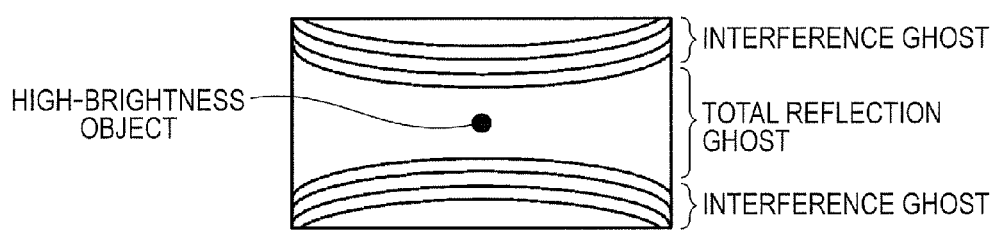
FIG. 14 is a schematic diagram of a ghost to be solved by the present invention.

Referring to FIGS. 9A and 9B, a color separating optical system according to Embodiment 6 of the present invention is described. Table 6 shows the structure of a multi-layer film formed on the surface 3 in Embodiment 6. FIG. 9A shows reflectance characteristics of the multi-layer film formed on the surface 3 at the incident angle θ1 corresponding to normal light, and FIG. 9B shows reflectance characteristics thereof at the incident angle δ=θ2B×0.9=74.8°.

The prism shape in Embodiment 6 is the same as in Embodiment 1. The difference is that the refractive index of the low refractive index film provided as the outermost layer of the first prism on the exit side. The multi-layer film includes a multi-layer film having 27 layers and a low refractive index film having a single layer in order from the substrate. As described in Table 8, the conditions of Expressions (1), (2), and (4) are satisfied to suppress the occurrence of an interference pattern satisfactorily.

The low refractive index film 103 in each of Embodiments described above can be formed of a porous material containing, for example, a fluorocarbon polymer or silica as a main component. Alternatively, the low refractive index film 103 can be formed of a structured film having micro periodic structure. This low refractive index film 103 is formed by providing a structured film 203 having micro periodic structure of 200 nm or less on a dielectric multi-layer film 202 formed on a substrate 201 as illustrated in a schematic diagram of FIG. 10. By controlling the packing factor of the structured film 203, the structured film 203 can be formed so that an apparent refractive index thereof may satisfy Conditional Expression (2).

Note that, an image pickup apparatus of the present invention encompasses an image pickup apparatus (camera main body) to and from which an exchangeable lens can be mounted and removed, as well as an image pickup apparatus originally including a photographing lens (image pickup apparatus for which the mounting/removal of a lens is not performed).

Comparative Example

Figure 15A:
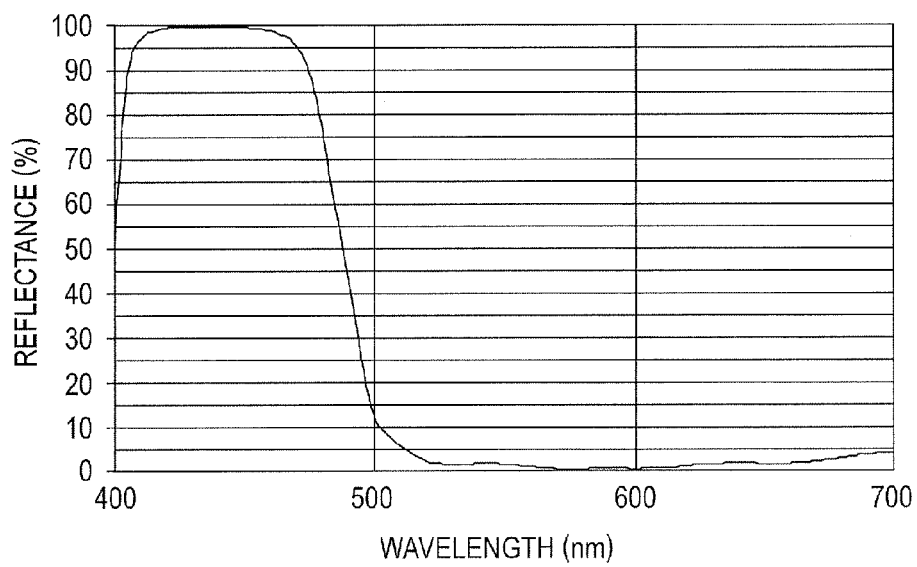
FIG. 15A is a graph of spectral characteristics for normal light in Comparative Example.
Figure 15B:
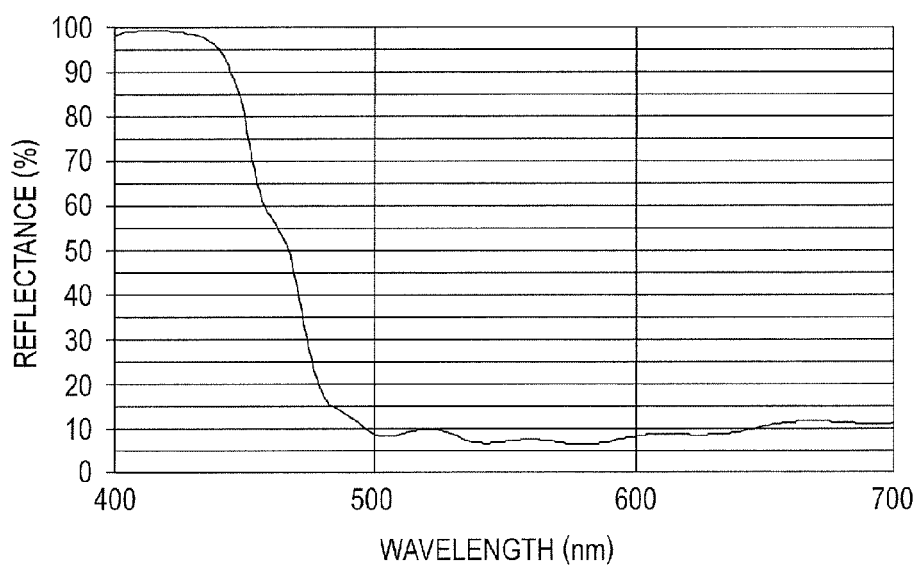
FIG. 15B is a graph of spectral characteristics for a ghost in Comparative Example.

Referring to FIGS. 15A and 15B, Comparative Example for more clarifying the effect of the present invention is described.

Table 7 shows the structure of a multi-layer film formed on the surface 3 in Comparative Example. FIG. 15A shows reflectance characteristics of the multi-layer film formed on the surface 3 at the incident angle θ1 corresponding to normal light, and FIG. 15B shows reflectance characteristics thereof at the incident angle δ=θ2B×0.9=74.8°.

As apparent from the numerical values corresponding to Expressions (1), (2), and (4) shown in Table 8, the lower limit condition of Conditional Expression (1) is not satisfied. Therefore, as shown in FIG. 15B, the multi-layer film formed on the surface 3 has a reflectance of about 10% in the wavelength region of 600 to 700 nm, which is significantly larger than any of Embodiments 1 to 6. The apex angle θ2 of the second prism in Comparative Example is 39.8°, and θ2/sin$^{-1}$(1/Ng)=0.991 is established. Accordingly, the incident angle of a ghost to the surface 3 is sufficiently small. However, the reflectance for a ghost is high because the optical thickness of the outermost layer does not satisfy Conditional Expression (1).

As described above, in the present invention, the optical thickness of each outermost layer of the surfaces sandwiching the air gap 5 needs to satisfy the condition of Conditional Expression (1). This is an essential condition for obtaining the effect of the present invention, and Conditional Expression (4) is a condition for obtaining the effect more preferably under the condition of Conditional Expression (1).

Table 8 shows the numerical values corresponding to Conditional Expressions (1), (2), and (4) in Examples and Comparative Example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

TABLE 1

(Numerical data on the structure of the multi-layer film of Embodiment 1)

| Layer No. | Refractive index | Optical film thickness (nm) |
| --- | --- | --- |
| | Air (n = 1.000) | |
| 1 | 1.250 | 267.4 |
| 2 | 2.199 | 88.589 |
| 3 | 1.654 | 81.174 |
| 4 | 2.199 | 164.685 |
| 5 | 1.654 | 105.15 |
| 6 | 2.199 | 108.626 |
| 7 | 1.654 | 122.222 |
| 8 | 2.199 | 109.153 |
| 9 | 1.654 | 126.482 |
| 10 | 2.199 | 112.306 |
| 11 | 1.654 | 119.992 |
| 12 | 2.199 | 109.154 |
| 13 | 1.654 | 124.796 |
| 14 | 2.199 | 104.475 |
| 15 | 1.654 | 126.069 |
| 16 | 2.199 | 122.835 |
| 17 | 1.654 | 102.127 |
| 18 | 2.199 | 110.03 |
| 19 | 1.654 | 139.345 |
| 20 | 2.199 | 106.108 |
| 21 | 1.654 | 94.459 |
| 22 | 2.199 | 110.464 |
| 23 | 1.654 | 189.682 |
| 24 | 2.199 | 35.09 |
| 25 | 1.654 | 159.933 |
| 26 | 2.199 | 99.373 |
| 27 | 1.654 | 111.476 |
| 28 | 2.199 | 52.046 |
| | Substrate (n = 1.5510) | |

TABLE 2

(Numerical data on the structure of the multi-layer film of Embodiment 2)

| Layer No. | Refractive index | Optical film thickness (nm) |
| --- | --- | --- |
| | Air (n = 1.000) | |
| 1 | 1.250 | 200.6 |
| 2 | 2.199 | 97.245 |
| 3 | 1.654 | 32.689 |
| 4 | 2.199 | 187.402 |
| 5 | 1.654 | 140.291 |
| 6 | 2.199 | 90.509 |
| 7 | 1.654 | 99.985 |
| 8 | 2.199 | 127.544 |
| 9 | 1.654 | 132.142 |
| 10 | 2.199 | 94.853 |
| 11 | 1.654 | 109.621 |
| 12 | 2.199 | 123.711 |
| 13 | 1.654 | 126.032 |
| 14 | 2.199 | 103.073 |
| 15 | 1.654 | 123.8 |
| 16 | 2.199 | 117.997 |
| 17 | 1.654 | 119.233 |
| 18 | 2.199 | 109.095 |
| 19 | 1.654 | 118.502 |
| 20 | 2.199 | 115.087 |
| 21 | 1.654 | 114.585 |
| 22 | 2.199 | 106.543 |
| 23 | 1.654 | 156.243 |
| 24 | 2.199 | 61.259 |
| 25 | 1.654 | 167.449 |
| 26 | 2.199 | 104.625 |

TABLE 2-continued (Numerical data on the structure of the multi-layer film of Embodiment 2)

| Layer No. | Refractive index | Optical film thickness (nm) |
|---|---|---|
| 27 | 1.654 | 106.93 |
| 28 | 2.199 | 73.918 |
| Substrate (n = 1.5510) | | |

TABLE 3

(Numerical data on the structure of the multi-layer film of Embodiment 3)

| Layer No. | Refractive index | Optical film thickness (nm) |
|---|---|---|
| | Air (n = 1.000) | |
| 1 | 1.250 | 294.1 |
| 2 | 2.199 | 48.607 |
| 3 | 1.654 | 124.616 |
| 4 | 2.199 | 165.272 |
| 5 | 1.654 | 72.336 |
| 6 | 2.199 | 117.608 |
| 7 | 1.654 | 130.564 |
| 8 | 2.199 | 103.515 |
| 9 | 1.654 | 115.604 |
| 10 | 2.199 | 119.045 |
| 11 | 1.654 | 121.861 |
| 12 | 2.199 | 104.858 |
| 13 | 1.654 | 120.239 |
| 14 | 2.199 | 114.102 |
| 15 | 1.654 | 126.624 |
| 16 | 2.199 | 107.554 |
| 17 | 1.654 | 118.108 |
| 18 | 2.199 | 114.718 |
| 19 | 1.654 | 125.704 |
| 20 | 2.199 | 109.468 |
| 21 | 1.654 | 112.397 |
| 22 | 2.199 | 105.302 |
| 23 | 1.654 | 169.18 |
| 24 | 2.199 | 57.361 |
| 25 | 1.654 | 155.303 |
| 26 | 2.199 | 96.797 |
| 27 | 1.654 | 127.231 |
| 28 | 2.199 | 48.581 |
| Substrate (n = 1.5510) | | |

TABLE 4

(Numerical data on the structure of the multi-layer film of Embodiment 4)

| Layer No. | Refractive index | Optical film thickness (nm) |
|---|---|---|
| | Air (n = 1.000) | |
| 1 | 1.250 | 216.18 |
| 2 | 2.199 | 88.589 |
| 3 | 1.654 | 81.174 |
| 4 | 2.199 | 164.685 |
| 5 | 1.654 | 105.15 |
| 6 | 2.199 | 108.626 |
| 7 | 1.654 | 122.222 |
| 8 | 2.199 | 109.153 |
| 9 | 1.654 | 126.482 |
| 10 | 2.199 | 112.306 |
| 11 | 1.654 | 119.992 |
| 12 | 2.199 | 109.154 |
| 13 | 1.654 | 124.796 |
| 14 | 2.199 | 104.475 |
| 15 | 1.654 | 126.069 |
| 16 | 2.199 | 122.835 |
| 17 | 1.654 | 102.127 |
| 18 | 2.199 | 110.03 |
| 19 | 1.654 | 139.345 |
| 20 | 2.199 | 106.108 |
| 21 | 1.654 | 94.459 |
| 22 | 2.199 | 110.464 |
| 23 | 1.654 | 189.682 |
| 24 | 2.199 | 35.09 |
| 25 | 1.654 | 159.933 |
| 26 | 2.199 | 99.373 |
| 27 | 1.654 | 111.476 |
| 28 | 2.199 | 52.046 |
| Substrate (n = 1.5510) | | |

TABLE 5

(Numerical data on the structure of the multi-layer film of Embodiment 5)

| Layer No. | Refractive index | Optical film thickness (nm) |
|---|---|---|
| | Air (n = 1.000) | |
| 1 | 1.310 | 267.4 |
| 2 | 2.199 | 62.358 |
| 3 | 1.654 | 176.007 |
| 4 | 2.199 | 69.833 |
| 5 | 1.654 | 134.942 |
| 6 | 2.199 | 125.888 |
| 7 | 1.654 | 109.593 |
| 8 | 2.199 | 105.365 |
| 9 | 1.654 | 128.182 |
| 10 | 2.199 | 116.381 |
| 11 | 1.654 | 119.605 |
| 12 | 2.199 | 110.267 |
| 13 | 1.654 | 116.114 |
| 14 | 2.199 | 110.816 |
| 15 | 1.654 | 130.908 |
| 16 | 2.199 | 113.461 |
| 17 | 1.654 | 103.273 |
| 18 | 2.199 | 119.852 |
| 19 | 1.654 | 126.207 |
| 20 | 2.199 | 112.775 |
| 21 | 1.654 | 93.855 |
| 22 | 2.199 | 108.116 |
| 23 | 1.654 | 193.437 |
| 24 | 2.199 | 41.082 |
| 25 | 1.654 | 135.994 |
| 26 | 2.199 | 130.006 |
| 27 | 1.654 | 88.26 |
| 28 | 2.199 | 62.011 |
| Substrate (n = 1.5510) | | |

TABLE 6

(Numerical data on the structure of the multi-layer film of Embodiment 6)

| Layer No. | Refractive index | Optical film thickness (nm) |
|---|---|---|
| | Air (n = 1.000) | |
| 1 | 1.100 | 267.4 |
| 2 | 2.199 | 42.353 |
| 3 | 1.654 | 143.406 |
| 4 | 2.199 | 149.364 |

TABLE 6-continued (Numerical data on the structure of the multi-layer film of Embodiment 6)

| Layer No. | Refractive index | Optical film thickness (nm) |
|---|---|---|
| 5 | 1.654 | 106.232 |
| 6 | 2.199 | 98.731 |
| 7 | 1.654 | 122.542 |
| 8 | 2.199 | 116.252 |
| 9 | 1.654 | 124.336 |
| 10 | 2.199 | 110.709 |
| 11 | 1.654 | 119.648 |
| 12 | 2.199 | 110.895 |
| 13 | 1.654 | 122.927 |
| 14 | 2.199 | 109.215 |
| 15 | 1.654 | 121.22 |
| 16 | 2.199 | 120.65 |
| 17 | 1.654 | 109.897 |
| 18 | 2.199 | 108.523 |
| 19 | 1.654 | 125.721 |
| 20 | 2.199 | 123.905 |
| 21 | 1.654 | 91.65 |
| 22 | 2.199 | 99.137 |
| 23 | 1.654 | 196.699 |
| 24 | 2.199 | 52.659 |
| 25 | 1.654 | 123.714 |
| 26 | 2.199 | 133.186 |
| 27 | 1.654 | 84.961 |
| 28 | 2.199 | 72.673 |
| Substrate (n = 1.5510) | | |

TABLE 7

(Numerical data on the structure of the multi-layer film of Comparative Example)

| Layer No. | Refractive index | Optical film thickness (nm) |
|---|---|---|
| Air (n = 1.000) | | |
| 1 | 1.470 | 150 |
| 2 | 2.199 | 186.754 |
| 3 | 1.654 | 69.863 |
| 4 | 2.199 | 82.594 |
| 5 | 1.654 | 125.805 |
| 6 | 2.199 | 155.661 |
| 7 | 1.654 | 75.244 |
| 8 | 2.199 | 107.052 |
| 9 | 1.654 | 128.719 |
| 10 | 2.199 | 124.389 |
| 11 | 1.654 | 104.751 |
| 12 | 2.199 | 111.276 |
| 13 | 1.654 | 125.447 |
| 14 | 2.199 | 115.488 |
| 15 | 1.654 | 119.278 |
| 16 | 2.199 | 107.518 |
| 17 | 1.654 | 121.032 |
| 18 | 2.199 | 114.936 |
| 19 | 1.654 | 123.365 |
| 20 | 2.199 | 112.433 |
| 21 | 1.654 | 104.906 |
| 22 | 2.199 | 114.229 |
| 23 | 1.654 | 162.454 |
| 24 | 2.199 | 64.851 |
| 25 | 1.654 | 133.931 |
| 26 | 2.199 | 129.56 |
| 27 | 1.654 | 103.327 |
| 28 | 2.199 | 65.087 |
| Substrate (n = 1.5510) | | |

TABLE 8

| Embodiment | nd (nm) | θ nm (deg) | Expression (1) 0.70 < nd × cosθ2A/ (λ/4) < 1.2 (at λ = 650 nm) | Expression (4) 0.75 < θ2/sin$^{-1}$ (1/Ng) < 1.1 | Expression (2) 1.05 < Nm < 1.34 |
|---|---|---|---|---|---|
| 1 | 267.4 | 39.8 | 1 | 0.99 | 1.25 |
| 2 | 200.6 | 39.8 | 0.75 | 0.99 | 1.25 |
| 3 | 294.1 | 39.8 | 1.1 | 0.99 | 1.25 |
| 4 | 216.18 | 32.11 | 1 | 0.8 | 1.25 |
| 5 | 267.4 | 39.8 | 1 | 0.99 | 1.31 |
| 6 | 267.4 | 39.8 | 0.71 | 0.99 | 1.1 |
| Comparative Example | 150.0 | 39.8 | 0.68 | 0.99 | 1.47 |

This application claims the benefit of Japanese Patent Application No. 2011-250422, filed Nov. 16, 2011, which is hereby incorporated by reference herein in its entirety.

What is claimed is:

1. A color separating optical system for separating an incident beam into a plurality of color beams, comprising:
a first prism including a first surface into which the incident beam enters and a second surface for separating the incident beam into a reflected beam and a transmitted beam, for separating the reflected beam; and
a second prism including a third surface disposed to have an air gap interposed between the third surface and the second surface and a fourth surface for separating a beam entering from the third surface into a reflected beam and a transmitted beam, and allowing the reflected beam reflected by the fourth surface to exit from the second prism after being reflected by the third surface,
wherein at least one of the second surface and the third surface has a multi-layer film formed thereon, and
wherein the following expression is satisfied:

$0.70 < nd \times \cos\theta 2A/(\lambda/4) < 1.2$, where $\theta 2A = \sin^{-1}\{(Ng/Nm)\sin(\theta 2)\}$, λ represents a central wavelength (nm) in a wavelength range of the beam to be separated by the second prism, nd represents an optical film thickness (nm) of an outermost layer of the multi-layer film, Nm represents a refractive index of the outermost layer of the multi-layer film with respect to the central wavelength, Ng represents a refractive index of a glass material of the second prism with respect to the central wavelength in the wavelength range of color light to be separated by the second prism, and θ2 represents an apex angle formed by the third surface and the fourth surface of the second prism.

2. A color separating optical system according to claim 1, wherein the following conditional expression is satisfied:

$0.75 < \theta 2/\sin^{-1}(1/Ng) < 1.1$.

3. A color separating optical system according to claim 1, wherein the following conditional expressions are satisfied:

$1.05 < Nm < 1.34$; and $1.35 \leq Ng$.

4. A color separating optical system according to claim 3, wherein the outermost layer comprises a porous material containing one of a fluorocarbon polymer and silica as a main component.

5. A color separating optical system according to claim 3, wherein the outermost layer comprises a structured film having micro periodic structure.

6. An image pickup apparatus, comprising the color separating optical system according to claim 1.

* * * * *